US011396761B2

(12) United States Patent
Grimm

(10) Patent No.: US 11,396,761 B2
(45) Date of Patent: Jul. 26, 2022

(54) SAFETY SWITCH

(71) Applicant: Euchner GmbH + Co. KG, Leinfelden-Echterdingen (DE)

(72) Inventor: Ilo Grimm, Waldenbuch (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 677 days.

(21) Appl. No.: 16/152,431

(22) Filed: Oct. 5, 2018

(65) Prior Publication Data

US 2019/0112839 A1 Apr. 18, 2019

(30) Foreign Application Priority Data

Oct. 18, 2017 (EP) .................................... 17197166
Nov. 16, 2017 (EP) .................................... 17202141

(51) Int. Cl.

*E05B 47/06* (2006.01)
*H01H 27/00* (2006.01)
*H01H 3/16* (2006.01)
*F16P 3/08* (2006.01)
*F16P 3/10* (2006.01)
*E05B 47/00* (2006.01)

(52) U.S. Cl.

CPC ...... *E05B 47/0696* (2013.01); *E05B 47/0607* (2013.01); *F16P 3/08* (2013.01); *F16P 3/10* (2013.01); *H01H 3/163* (2013.01); *H01H 27/007* (2013.01); *E05B 2047/0069* (2013.01); *H01H 2300/032* (2013.01)

(58) Field of Classification Search

CPC ............ E05B 47/0696; E05B 47/0607; E05B 2047/0069; F16P 3/08; F16P 3/10; H01H 3/163; H01H 27/007; H01H 2300/032

See application file for complete search history.

(56) References Cited

U.S. PATENT DOCUMENTS 1,348,017 A * 7/1920 Leon .................. E05B 47/0607 49/379
1,413,830 A * 4/1922 Cudera .............. E05B 47/0603 292/201
1,417,430 A * 5/1922 Tulloch .............. E05B 47/0002 292/201

(Continued)

FOREIGN PATENT DOCUMENTS

CN 101802328 A * 8/2010 ......... E05B 47/0004
DE 2853027 C2 * 4/1988 ......... E05B 47/0607

(Continued)

*Primary Examiner* — Kristina R Fulton
*Assistant Examiner* — Tal Saif
(74) *Attorney, Agent, or Firm* — Michael Soderman

(57) ABSTRACT

A safety switch (2) with a latching unit (12), by means of which an associated actuator (3) is held in a latched position. The latching unit (12) has an opening (9) and a blocking element. In a latched position, the blocking element projects into the opening (9) and rear-engages an actuator head (8) of the actuator (3), which is in the latched position. The blocking element is held in the latched position by means of a positioning element with a setting force. When the actuator head (8) is inserted into or removed from the opening (9), the actuator head (8) pivots the blocking element out against the setting force.

10 Claims, 4 Drawing Sheets

4 10 22 18 19 5 9 13a 13 14 12 21a 20 15 13b 15a 17 16 2 21 23 24 6 11 7 8 1 3

(56) References Cited

U.S. PATENT DOCUMENTS

| | | | | | |
|---|---|---|---|---|---|
| 1,635,028 | A * | 7/1927 | Burr | E05B 47/026 292/DIG. 3 |
| 2,045,186 | A * | 6/1936 | Honsel | E05B 47/0607 70/279.1 |
| 2,325,225 | A * | 7/1943 | Burke | E05B 47/0002 292/201 |
| 4,854,145 | A * | 8/1989 | Arai | E05B 47/023 70/250 |
| 5,062,668 | A * | 11/1991 | Onderka | F16P 3/10 292/25 |
| RE34,396 | E | 10/1993 | Wollenhaupt | |
| 5,439,262 | A * | 8/1995 | Fuss | E05B 47/0047 292/201 |
| 2008/0007408 | A1 * | 1/2008 | Hwang | E05D 11/00 340/687 |

FOREIGN PATENT DOCUMENTS

| | | | | |
|---|---|---|---|---|
| WO | WO-2013068036 | A1 * | 5/2013 | E05B 47/02 |
| WO | 2015155744 | A1 | 1/2015 | |
| WO | WO-2015155744 | A1 * | 10/2015 | F16P 3/08 |

* cited by examiner 1
2
3
4
5
6
7
8
9
10
11
12
13
13a
13b
14
15
15a
16
17
18
19
20
21
21a
22
23
24

5
24
19
20
23
18
21b
21
22
21a
15a
2
10
7
13a
12
13b
4
17
13
14
15
16

SAFETY SWITCH

CROSS REFERENCE TO RELATED APPLICATIONS

This application claims the priority of EP 17197166.6 filed on 2017 Oct. 18 and the priority of EP 17202141.2 filed on 2017 Nov. 16; all applications are incorporated by reference herein in their entirety.

BACKGROUND

Such a safety switch comprises, with an associated actuator, a safety switch arrangement used in the area of safety technology. For use in the area of safety technology, especially in the area of personal protection, the safety switch arrangement must meet standards-compliance requirements with regard to fault reliability, such that it is ensured that an appropriately safe monitoring function can be executed using the safety switch arrangement. Such a safety switch arrangement can typically be used to secure access to a hazard area. For example, a safety switch arrangement can be used as a lock for a barrier protective element, such as a safety door providing access to a hazard area. In this case, a hazardous system inside the hazard area can only be released for operation if the safety door is locked using the safety switch arrangement. The release of the system can be performed using a safety control unit to which safety-related control signals are supplied.

For latching the safety door when the safety door is in its closed position, the actuator, in the form of a bar or similar, is brought into engagement with the safety switch by, for example, inserting the actuator into a recess of the safety switch. This latching process is controlled by means of an RFID reader in the safety switch which detects a transponder in the actuator.

In addition to this latching process, locking of the safety door may be provided. Such a locking device is known, for example, from WO 2016/058718 A1. In this locking device, a locking bolt is provided that is actuated by means of an electric motor having a planetary gear train. With the electric drive, the locking bolt can be moved into a blocking position in which the actuator is locked by the locking bolt.

SUMMARY

The invention concerns a safety switch (2) with a latching unit (12), by means of which an associated actuator (3) is held in a latched position. The latching unit (12) has an opening (9) and a blocking element. In a latched position, the blocking element projects into the opening (9) and rear-engages an actuator head (8) of the actuator (3), which is in the latched position. The blocking element is held in the latched position by means of a positioning element with a setting force. When the actuator head (8) is inserted into or removed from the opening (9), the actuator head (8) pivots the blocking element out against the setting force.

DETAILED DESCRIPTION

The invention seeks to solve the problem of providing a compact safety switch that enables a reliable safety function.

For solving this problem, the features of claim 1 are provided. Advantageous embodiments and useful further developments of the inventions are described in the dependent claims.

The invention concerns a safety switch with a latching unit by means of which an associated actuator is held in a latched position. The latching unit has an opening and a blocking element. In a latched position, the blocking element projects into the opening and rear-engages an actuator head of the actuator, which is in the latched position. The blocking element is held in the latched position by means of a positioning element under a setting force. When the actuator head is inserted into or removed from the opening, the actuator head pivots the blocking element out against the setting force.

The small and compact design of the safety switch represents an essential advantage.

The safety switch is easy to install and can be used flexibly in combination with an actuator to create a safety switch arrangement. The safety switch arrangement formed in this manner can generally be used in the area of safety technology, especially for securing access to a hazard area.

The functional principle of the latching unit of the safety switch according to the invention is such that the blocking element in its latched position projects into the opening of the latching unit so that a reduced opening results. The front end of the actuator has a cross-sectional area that is larger than this reduced opening but smaller than the opening itself. If therefore the actuator is inserted with its front free end through the reduced opening of the latching unit, the blocking element is pivoted out against the setting force and can thus pass through the opening. Once the actuator is moved into its latched position, the blocking element is again returned to the latched position by means of the setting force and projects into the opening, by which means the blocking element rear-engages the front end of the actuator, which ensures a form-locked latching and locking of the actuator.

It is especially advantageous if the actuator is matched to the latching unit of the safety switch such that the latter has an actuator head that is connected to a core body of the actuator by a connecting element. The longitudinal axis of the connecting element is advantageously oriented in a stable base position perpendicular to the surface of the core body and has high rigidity in its axial direction. Thus, the actuator head can be moved with touch pressure against the blocking element projecting into the opening, which causes the blocking element to be pivoted out against the setting force and the actuator to be moved into the latched position. In the latched position of the actuator, the blocking element is then moved into the latched position by the setting force and rear-engages the actuator such that it is held and locked in the latched position.

According to an advantageous embodiment, the blocking element is realized as a latch.

In this regard the latch, with its lower end, is engaged with the positioning element. In the latched position, the upper end of the latch projects into the opening; the upper end has a circular edge the curvature radius of which corresponds to the radius of the opening.

The latch forms a cost-effective mechanical component with compact dimensions.

By means of the circular edge of the upper end of the latch, it is ensured that, when the actuator head is pushed into the opening and the latch is thereby pivoted out of the latched position, the edge of the latch approximately or exactly coincides with an edge region of the opening such that the latch fully exposes the opening and the actuator head can be pushed into the opening without hindrance.

In general, the opening is not restricted to a circular contour, but rather can have any kind of contours. Accordingly, the edge of the latch is generally adapted to the contour of the opening.

Adapted to the form of the blocking element, the positioning element is formed by a rocker.

The rocker has a bar-shaped end of the rocker element. A pivot bearing is provided at a first longitudinal end of the rocker element. A spring that generates the setting force for the blocking element abuts the underside of the rocker element.

The rocker has a simple structure with just a few separate parts. The positioning element formed in this manner can be realized in compact designs. The setting force is realized by very straightforward means by the spring acting on the rocker element.

In this embodiment, the blocking element is moved into the latched position by a pivot motion. In general, positioning elements that move the blocking element into the latched position by pushing movements or the like are also conceivable.

To ensure effective transmission of the setting force to the blocking element, it is expedient that the spring abuts a central region of the rocker element on the latter's underside. In this region, the lower end of the latch rests on the upper side of the rocker element.

An additional advantage is that the setting force can be adjusted by pre-tensioning the spring.

This enables straightforward adjustment to various applications, especially various actuators.

According to an advantageous embodiment of the invention, the latching unit is associated with a locking unit. The blocking element is locked in its latched position by means of the locking unit.

An additional safety function of the safety switch is provided by means of this locking.

It is advantageous if the locking unit has a hinged armature solenoid that has an electromagnet and an armature that can be pivoted using the electromagnet. The armature can be brought into a locked position. In the locked position, the armature latches the rocker.

The hinged armature solenoid forms a compact unit by means of which reliable locking can be effected. The locking is implemented in a straightforward manner in that the armature of the hinged armature solenoid is brought into engagement with the rocker.

This can be realized in an especially straightforward manner in that the rocker has a detent at its second free end. In the locked position, the armature is engaged with this detent.

It is especially advantageous for the armature to be pivotable about a swivel axis. A pivoting arm forms a lever that can be brought into engagement with the rocker. A second pivoting arm forms a counterweight. Improved shock stability is achieved by means of the counterweight.

Due to the improved shock stability, the functionality of the hinged armature solenoid remains largely unaffected by external forces.

The safety switch according to the invention together with the actuator forms a safety switch arrangement for use in the area of safety technology.

It is advantageous for the actuator head to be ball-shaped.

The actuator has a base body that is connected to the actuator head by a connecting element, wherein the cross-sectional surface of the connecting element is smaller than the cross-sectional surface of the actuator head.

The respective designs of the safety switch and of the actuator are adapted to one another in order to ensure optimal functioning. In particular, the geometry of the opening is adapted to the shape of the actuator head.

Furthermore, the latched position of the actuator is monitored by recording signals from a transponder in the actuator with a reader unit of the safety switch.

This monitoring function can be used to identify errors in the locking of the actuator. This represents an essential measure to meet the required safety level for the use of the safety switch arrangement in the area of safety technology.

BRIEF DESCRIPTION OF THE DRAWINGS

The invention is explained below based on the drawings. The following is shown in.

DETAILED DESCRIPTION OF THE PREFERRED EMBODIMENTS

Figure 1:
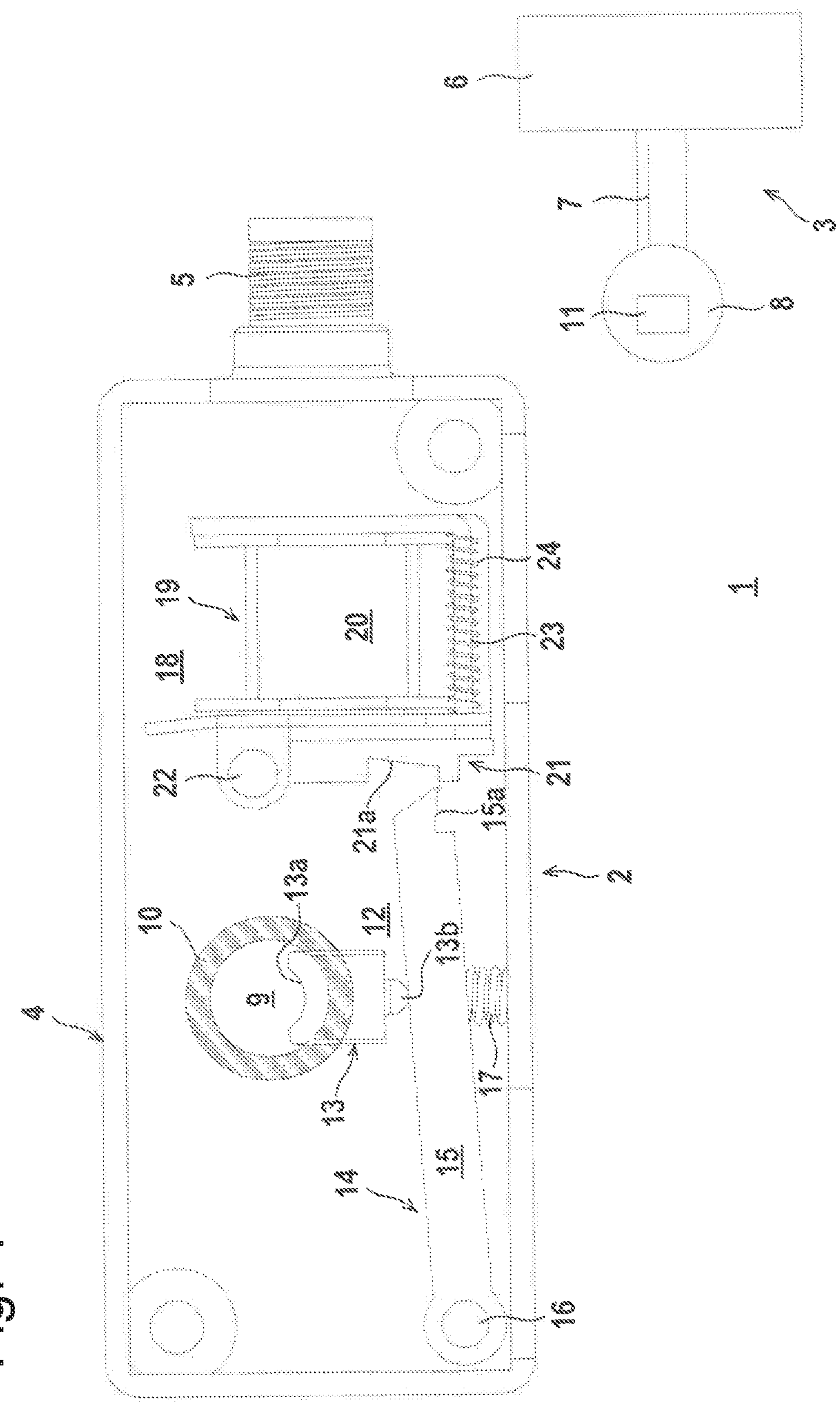
FIG. 1 Exemplary embodiment of the safety switch arrangement in accordance with the invention with a safety switch and an actuator.

FIG. 1 shows schematically an exemplary embodiment of a safety switch arrangement 1 with a safety switch 2 and actuator 3.

This safety switch arrangement 1 can be used, for example, to secure a protected door that serves as access to a hazard area. The actuator 3 can be arranged at the safety door; the safety switch 2 can be arranged on a frame surrounding the door opening that is closed off by means of the safety door.

The components of the safety switch 2 are integrated into a housing 4 from which a cable connector 5 protrudes for connection to external units.

As is evident from FIG. 1, the actuator 3 has a core body 6 in which a connecting element 7 is mounted. The connecting element 7 is formed by an elongated body, the cross-section of which is at least approximately constant over its entire length.

The connecting element 7 is mounted in the core body 6 with its first free end such that the longitudinal axis of the connecting element 7 is oriented perpendicular to the surface of the core body 6. At the other end of the connecting element 7, an actuator head 8 is mounted. In the present case, the actuator head 8 is sphere-shaped. In principle, the actuator head 8 can also be formed by another body with rotational symmetry. In principle, the actuator head 8 can also have an oval or polygonal cross-section. In any case the actuator head 8 has a larger cross-sectional area than the connecting element 7, such that the actuator head 8 projects across its entire cross-sectional plane beyond the connecting element 7.

In general, the connecting element 7 is made of a material that ensures high rigidity of the connecting element 7 in the axial direction and which maintains the connecting element 7 in its base position shown in FIG. 1, especially when the effects of gravity are present.

On a sidewall of the safety switch 2, an opening 9 is provided into which a cavity in the safety switch 2 opens out into which cavity the actuator head 8 can be inserted such that the actuator 3 is then in its latched position.

The opening 9 is circular in form. A reading coil 10 is provided in the edge region of the sidewall that delimits the opening 9. The reading coil 10 is mounted on a separate circuit board (not shown) and forms a reader unit, specifically an RFID reader unit. Corresponding to this, a transponder 11 is mounted in the actuator head 8. In general, the transponder 11 can also be provided in the base body 6 of the actuator 3.

By means of the reading coil 10, signals from the transponder 11 can be detected in the actuator head 8 when the actuator 3 is moved into the latched position in the safety switch 2, by which means it can be verified that the actuator 3 is actually in the latched position.

For secure latching and locking of the actuator 3 in its latched position, the safety switch 2 has a latching unit 12. The latching unit 12 has a blocking element in the form of a latch 13 that can, with its upper end, be moved into the region of the opening 9.

The latch 13 is composed of a planar component that is closed-off at its upper end by a circular-shaped edge 13*a*. At the lower edge, a convex support element 13*b* is provided which forms a mechanical coupling to a positioning element. The latch 13 is displaceably mounted in the axial direction, i.e., in the vertical direction. Preferably, guide elements (not shown) are additionally provided.

The positioning element is realized in the form of a rocker 14 that has a bar-shaped rocker element 15. A swivel bearing 16 is provided at a first longitudinal end of the rocker element 15 such that the rocker element 15 is pivotable about a swivel axis extending through the swivel bearing 16. A detent 15*a* is provided at the second longitudinal end of the rocker element 15.

The rocker 14 formed in this manner is associated with a spring 17, the longitudinal axis of which extends in the vertical direction and the lower end of which is mounted on a stationary support. The upper end of the spring 17 abuts a central region of the rocker element 15 on the underside of the latter. The support element 13*b* of the latch 13 abuts the rocker element 15 on the latter's upper side in the same region. As evident in FIG. 1, the support element 13*b* is arranged along the longitudinal axis of the spring 17. The spring force of the spring 17 effects a setting force that is transmitted from the rocker element 15 to the latch 13 such that the latch 13 is pushed upwards and with its upper edge 13*a* projects into the opening 9. This position shown in FIG. 1 is the locked and latched position of the latch 13.

The setting force can be adjusted by appropriately pretensioning the spring 17.

This latching unit 12 is associated with a locking unit 18 by means of which the latch 13 can be locked in place.

The locking unit 18 has a hinged armature solenoid 19 that has an electromagnet 20 and an armature 21. The armature 21 is realized in the form of a lever that forms a pivoting arm 21*a* which is pivoted about a swivel bearing 22. The arrangement can be expanded by a second pivoting arm 21*b* that forms a counterweight to the lever, thereby resulting in improved shock stability of the hinged armature solenoid 19. The hinged armature solenoid 19 furthermore has a spring element 24 mounted on a guide segment 23 of the electromagnet 20. As a result, the armature 21 is pivoted out when current is supplied to the electromagnet 20. Locking of the latching unit 12 is effected insofar as the armature 21 is pivoted out such that it clicks into the detent 15*a* of the rocker element 15. In general, the hinged armature solenoid 19 can be shaped differently in various embodiments and works according to the normally de-energized circuit (i.e., open circuit) principle or normally energized circuit principle. It can also be implemented as a bistable magnet.

Figure 2A:
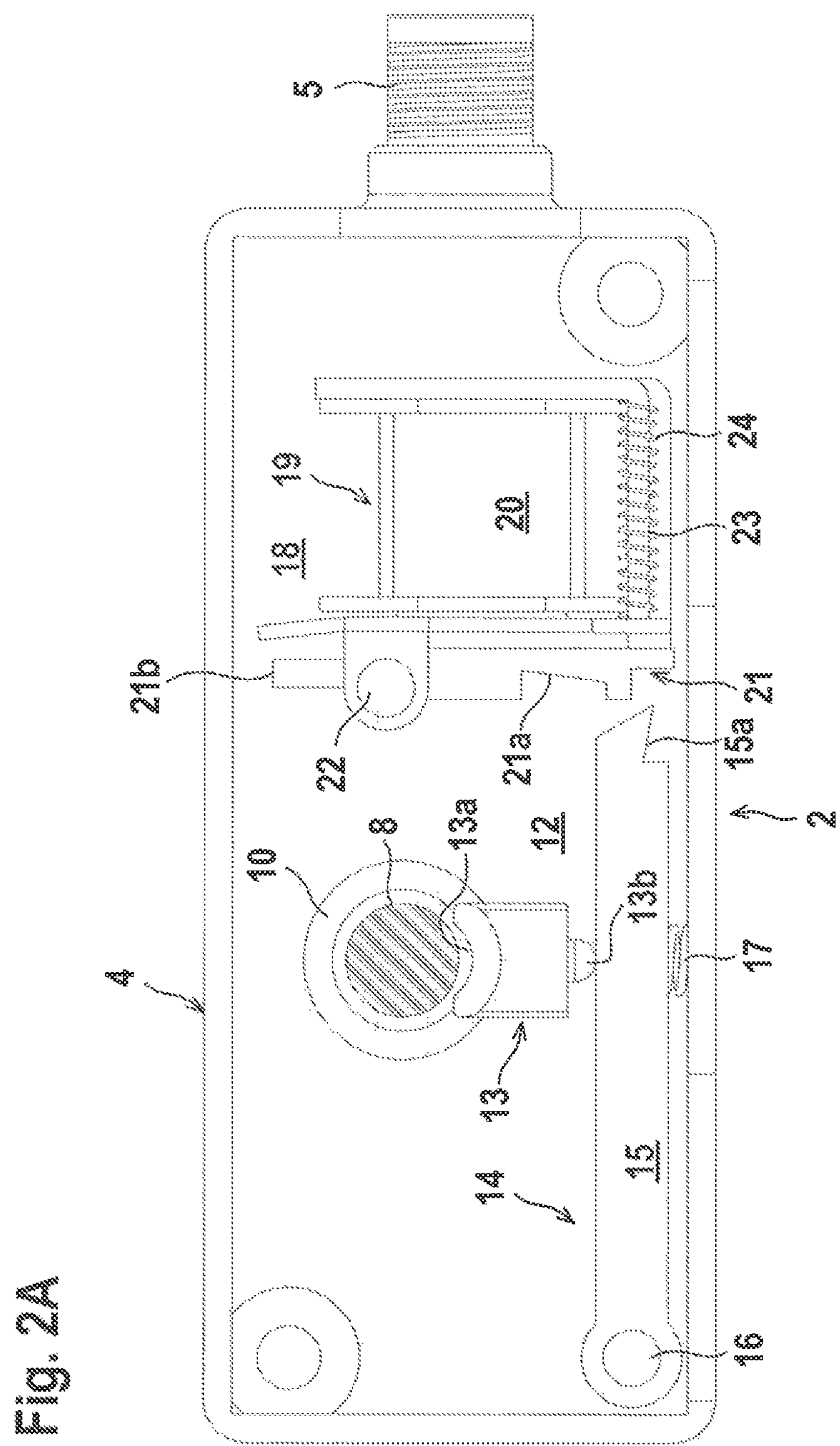
FIG. 2A One state of the latching unit and locking unit of the safety switch arrangement from FIG. 1, upon insertion of the actuator into a latched position.
Figure 2B:
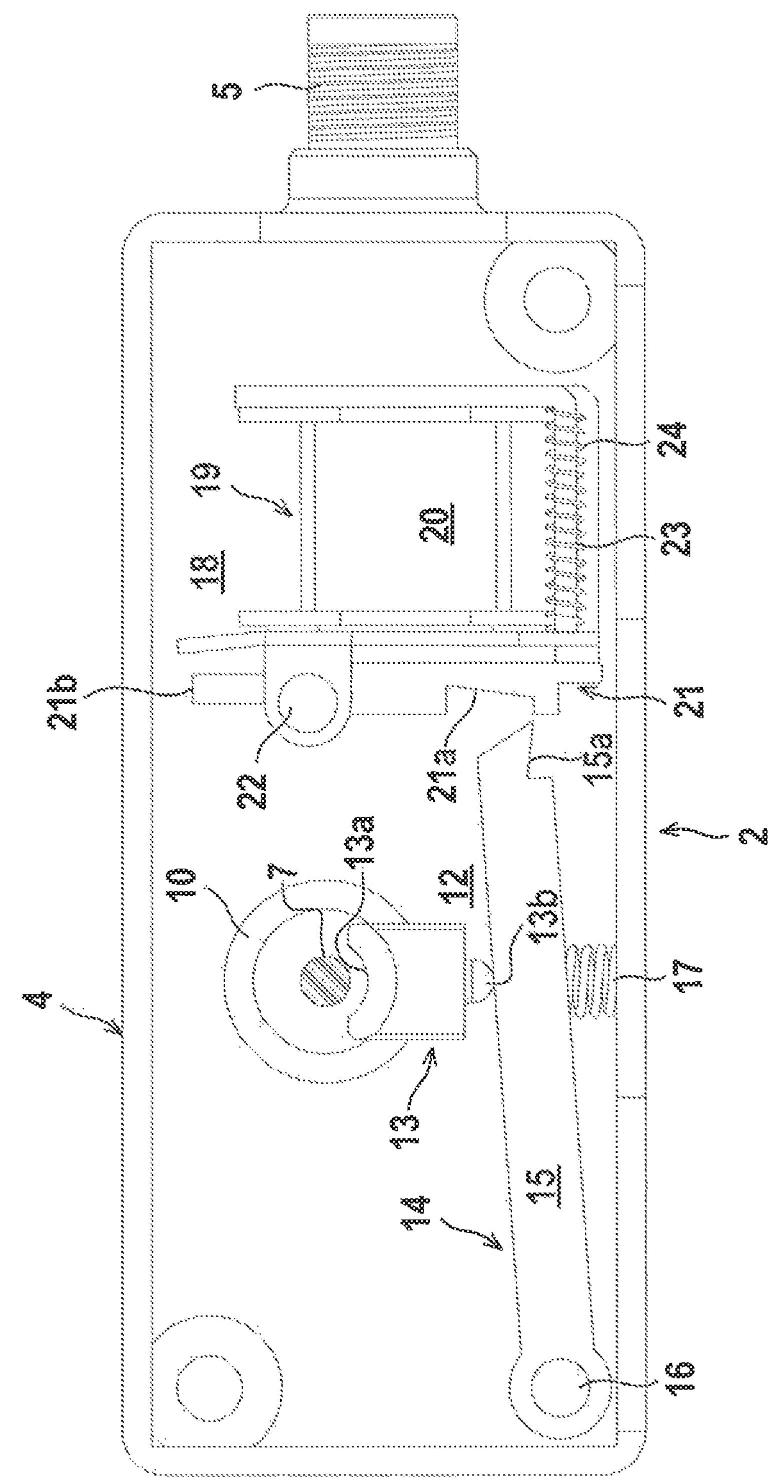
FIG. 2B Another state of the latching unit and locking unit of the safety switch arrangement from FIG. 1, upon insertion of the actuator into a latched position.
Figure 2C:
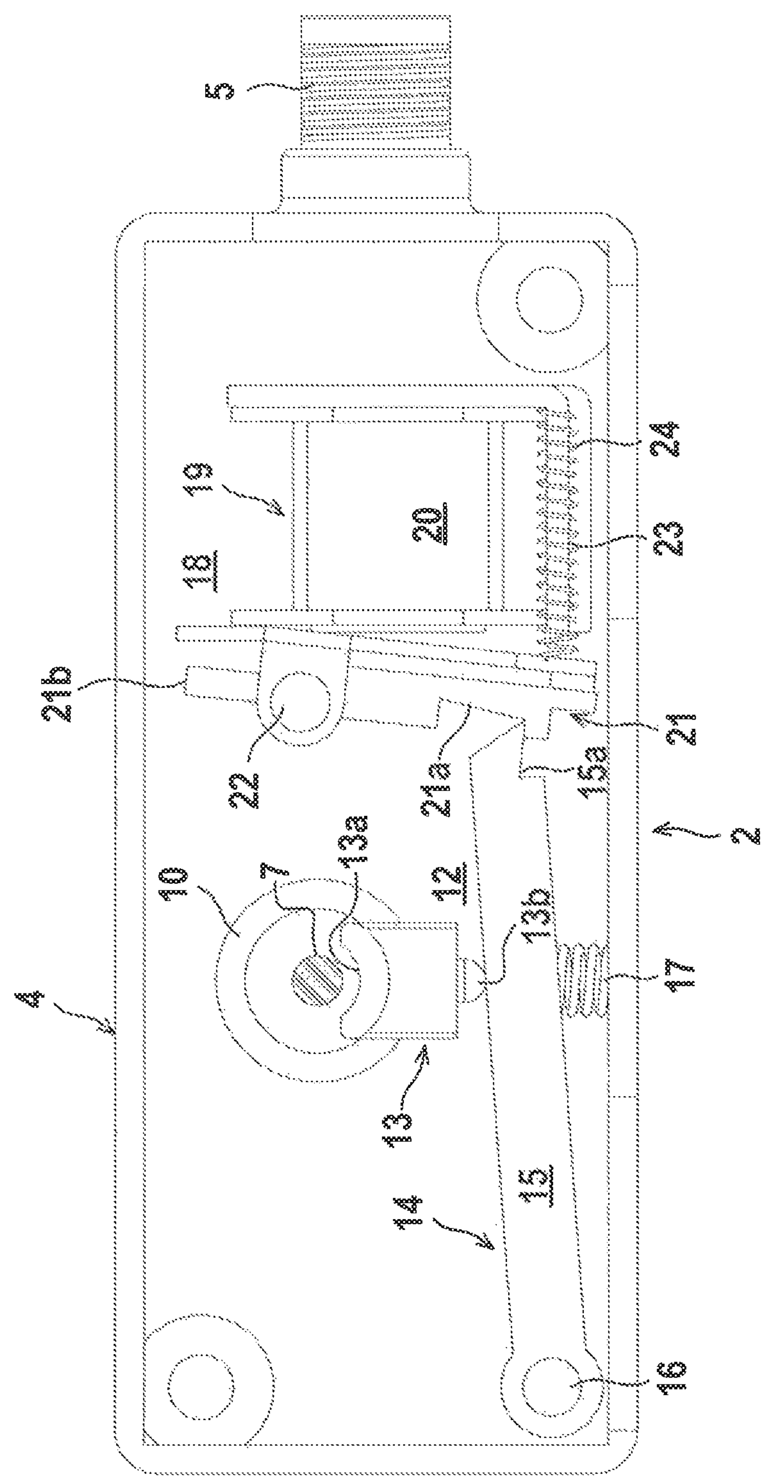
FIG. 2C A further state of the latching unit and locking unit of the safety switch arrangement from FIG. 1, upon insertion of the actuator into a latched position.

The functioning of the latching and locking of the safety switch arrangement 1 is explained based on FIGS. 2A to 2C.

In the starting position, for example, with an open protective door, the actuator 3 lies at a distance from the protective door. When the protective door is closed, the actuator 3 is moved into a latching unit 12 inside the safety switch 2.

To this end, the actuator 3 with the actuator head 8 is moved against the opening 9 in the safety switch 2, wherein in this starting position the latch 13 is in the latched position and projects into the opening 9.

When the actuator head 8 is inserted into the opening 9 of the safety switch 2, the latch 13 is pushed down and out of the latched position due to the pressing force of the actuator head 8 since the diameter of the actuator head 8 is adapted to the inner diameter of the opening 9 and fills it virtually completely. This situation is depicted in FIG. 2A. The actuator head 8 lies in the opening 9, and the latch 13 is pushed down and out of the latched position against the spring force of the spring 17 such that the upper circular curved edge 13*a* lies in the edge region of the opening 9. Here it is advantageous for the curvature radius of the upper edge 13*a* of the latch 13 to correspond to the radius of the opening 9 such that the edge contour of the latch 13 corresponds approximately or exactly to the edge contour of the opening 9. In general, the opening can also have a non-circular contour, wherein also the edge 13*a* is then adapted to this contour.

The actuator 3 is then pushed farther into a latched position such that the actuator head 8 lies completely in the cavity adjacent to the opening 9. Then, as shown in FIG. 2B, the connecting element 7 lies in the region of the opening 9. Since the diameter of the connecting element 7 is smaller than the diameter of the actuator head 8, the latch 13 is pushed up and into the latched position (FIG. 2B) by the spring force from the spring 17 and secures and locks the actuator head 8 in the latched position. The locked and latched position of the actuator 3 is monitored by reading the signals from the transponder 11 in the reader unit. In the locked and latched position, the latch 13 rear-engages the actuator head 8, thereby holding the actuator 3 in the latched position.

In the situation shown in FIG. 2B, the locking has not yet been activated, i.e., the armature 21 of the hinged armature solenoid 19 is not engaged with the detent 15*a* of the rocker element 15 of the rocker 14. Therefore, it is still possible to unlatch the actuator 3, i.e., the actuator 3 can be pulled out of the locked and latched position when exposed to forces, wherein then, when the actuator head 8 passes through the opening 9 of the safety switch 2, the latch 13 is pushed down and out of the latched position against the spring force.

Finally, FIG. 2C shows the situation when the actuator 3 is inserted into the latched position and locking is activated. In the latched position, the latch 13 in the latched position rear-engages the actuator head 8 and holds the actuator 3 in the latched position.

The locking is activated such that the armature 21 is pivoted out by means of the electromagnet 20 and engages in the detent 15*a* of the rocker 14. The rocker 14 is therefore secured in place. Due to the secured rocker 14, the actuator 3 can no longer move out of the latched position since the rocker 14 secures the latch 13 from moving out of the latched position. Therefore, the actuator 3 can only be released again when locking is deactivated, i.e., when the armature 21 is no longer engaged in the detent 15*a*.

When the safety switch arrangement 1 according to the invention is used to secure a protective door serving as access to a hazard area, the safety switch 2 can, when the actuator 3 is latched and locked, emit a switching signal that can be used to release a hazardous system within the hazard area for operation.

LIST OF REFERENCE NUMERALS (1) Safety switch arrangement
(2) Safety switch
(3) Actuator
(4) Housing
(5) Cable connection
(6) Core body
(7) Connecting element
(8) Actuator head
(9) Opening
(10) Reading coil
(11) Transponder
(12) Latching unit
(13) Latch
(13*a*) Edge
(13*b*) Support element
(14) Rocker
(15) Rocker element
(15*a*) Detent
(16) Swivel bearing
(17) Spring
(18) Locking unit
(19) Hinged armature solenoid
(20) Electromagnet
(21) Armature
(21*a*) Pivoting arm
(21*b*) Second pivoting arm/counterweight
(22) Swivel bearing
(23) Guide segment
(24) Spring element

The invention claimed is:

1. Safety switch (2) with a latching unit (12), by means of which an associated actuator (3) is held in a latched position, characterized in that the latching unit (12) has an opening (9) and a blocking element, wherein in the latched position, the blocking element projects into the opening (9) and an actuator head (8) rear-engages the actuator (3) that is in the latched position;

that the blocking element is held in the latched position by means of a positioning element with a setting force; and that, when the actuator head (8) is inserted into or removed from the opening (9), the actuator head (8) pivots the blocking element out against the setting force wherein the latched position of the actuator (3) is monitored by recording signals from a transponder (11) in the actuator (3) with a reader unit of the safety switch (2), when the actuator (3) is moved into the latched position in the safety switch (2)

wherein the positioning element is formed by a rocker (14), wherein the latching unit (12) is associated with a locking unit (18) by means of which the blocking element is held in the latched position, and wherein the locking unit (18) has a hinged armature solenoid (19) that has an electromagnet (20) and an armature (21) that can be pivoted using the electromagnet (20), wherein the armature (21) is brought into a locked position in which the armature (21) blocks the rocker (14).

2. Safety switch (2) according to claim 1, characterized in that the blocking element is formed by a latch (13).

3. Safety switch (2) according to claim 2, characterized in that the latch (13), with a lower end, is engaged with the positioning element, and that in the latched position, the upper end of the latch (13) projects into the opening (9), wherein the upper end has a circular edge (13*a*) that is adapted to the contour of the opening (9).

4. Safety switch (2) according to claim 1, characterized in that the latch (14) has a bar-shaped rocker element (15), wherein at a first longitudinal end of the rocker element (15) a swivel bearing (16) is provided, and wherein, on the underside of the rocker element (15), a spring (17) that generates the setting force for the blocking element is arranged.

5. Safety switch (2) according to claim 4, characterized in that the spring (17) abuts a central region of the rocker element (15) on the latter's underside, and that in this region a lower end of the latch (13) lies on the upper side of the rocker element (15).

6. Safety switch (2) according to claim 4, characterized in that the setting force is adjusted by pre-tensioning the spring (17).

7. Safety switch (2) according to claim 1, characterized in that the geometry of the opening (9) is adapted to the shape of the actuator head (8), wherein the actuator head (8) is ball-shaped or has an ovate or polygonal cross-section.

8. Safety switch (2) according to claim 1, characterized in that the rocker (14) has a detent (15*a*) at a second free end, wherein the armature (21) is engaged with this detent (15*a*) in the locked position.

9. Safety switch (2) according to claim 1, characterized in that the armature (21) is pivotable about a swivel axis, wherein a pivoting arm (21*a*) forms a lever that is brought into engagement with the rocker (14), and wherein a second pivoting arm forms a counterweight by means of which improved shock stability is achieved.

10. Safety switch arrangement (1) according to claim 1, characterized in that the actuator (3) has a base body (6) that is connected to the actuator head (8) by means of a connecting element (7), wherein the cross-sectional surface of the connecting element (7) is smaller than the cross-sectional surface of the actuator head (8).

* * * * *